Sept. 7, 1965  H. J. SHEAR, JR., ETAL  3,204,893
SIGNAL MIXING SYSTEM FOR SERVO ACTUATORS
Filed Jan. 21, 1963                                       6 Sheets-Sheet 1

INVENTORS
HERBERT J. SHEAR, JR.
HENRY E. A. ROHRS
BY
Knox & Knox

Sept. 7, 1965   H. J. SHEAR, JR., ETAL   3,204,893
SIGNAL MIXING SYSTEM FOR SERVO ACTUATORS
Filed Jan. 21, 1963   6 Sheets-Sheet 2

INVENTORS
HERBERT J. SHEAR, JR.
HENRY E. A. ROHRS
BY
Knox & Knox

United States Patent Office 3,204,893
Patented Sept. 7, 1965

1

3,204,893
SIGNAL MIXING SYSTEM FOR SERVO
ACTUATORS
Herbert J. Shear, Jr., El Cajon, and Henry E. A. Rohrs,
La Mesa, Calif., assignors to The Ryan Aeronautical
Co., San Diego, Calif.
Filed Jan. 21, 1963, Ser. No. 252,965
11 Claims. (Cl. 244—76)

This invention relates generally to vehicle stability control and particularly to stability control relative to two vehicle axes with control devices common to both axes.

Background

Stability control systems for vehicles, such as airplanes, helicopters, dirigibles, missiles, and similar craft, usually employ some form of gyro stabilizer platform as reference for stabilizing the vehicle relative to three axes. When the vehicle deviates from a reference axis, an error signal generated by a component of the stable platform, such as a gyro or accelerometer, is applied to the the associated axis control device in a direction that returns the vehicle axis to the reference axis.

Conventional aircraft have aileron, elevator, and rudder surfaces for control relative to the three axes. Missiles use jet vanes, engine gimbals, and other devices for control relative to the three axes by varying the magnitude or direction of thrust. Some types of vehicles use a control device that is common to more than one axis.

The instant invention uses devices common to two axes for stability control of vehicles designed for hovering and vertical take-off and landing. The magnitude and direction of thrust of air stream devices located in the vehicle wings or otherwise symmetrically relative to the two axes are varied by a unique method of collective and differential polarization of solenoids used to operate axis stability control actuators.

Objects

It is a principal object of this invention to provide stability relative to two vehicle axes with control devices common to both axes.

It is further an object of this invention to provide a novel method of collective and differential application for polarizing signals to solenoids.

It is another object of this invention to provide reliable operation of vehicle stability control actuators by using dual solenoids whereby said actuators operate satisfactorily when one solenoid is defective.

It is still another object of this invention to provide a simple system for vehicle stability control wherein the number of components required is reduced by use of common control devices and the method of combining error signals.

With these and other objects definitely in view, this invention consists in the novel combination and arrangement of elements as will be hereinafter fully described in the specification, particularly pointed out in the claims, and illustrated in the drawings that form a material part of this disclosure, and of which:

Description

FIGURES 1–7 illustrate several balanced circuit connections for solenoids in which the solenoids are polarized in one direction when an input signal is applied across two electrical balance points, some being polarized in the same direction collectively and others in the opposite direction differentially when another input signal is applied cross two different electrical balance points. In each figure, the electrical characteristics of all solenoids are identical. In all figures, for the polarities shown at the input terminals, the arrows indicate the polarization of each winding, the arrow head being positive. Arrows with double heads indicate opposite polarization by two signals.

Figure 1:
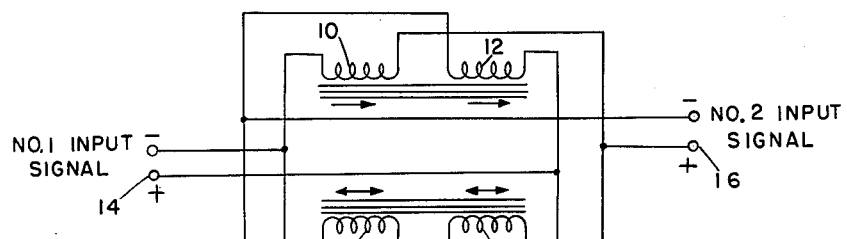
FIGURE 1 is a schematic diagram of two dual-winding solenoids connected in a balanced circuit with two input signals.

In FIGURE 1, two dual-winding solenoids are connected in a balanced circuit with one winding in each of four legs of the circuit. Windings 10 and 12 are polarized in the same direction by the two input signals 14 and 16, while windings 18 and 20 are polarized in opposite directions. Such an arrangement is suitable for control of elevons in aircraft using two control surfaces for the dual function of ailerons and elevator. Input signal 14, for example, could polarize all solenoids in the same direction for the same displacement of the two elevons in pitch control, while the effect of input signal 16 could displace the two elevons in opposite directions for roll control.

This arrangement also provides a safety factor in that failure of one winding will not make the related device inoperative, the other winding still being effective with negligible reduction in operability.

Figure 2:
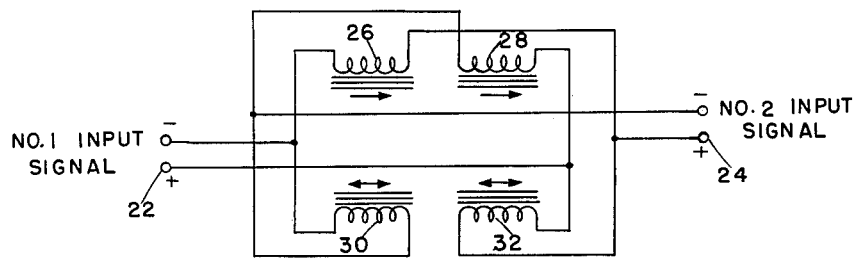
FIGURE 2 is a schematic diagram of four single-winding solenoids connected in a balanced circuit with two input signals.

The circuit in FIGURE 2 is similar to FIGURE 1, except that four single-winding solenoids are used instead of two dual-winding solenoids. Comparison of the two figures shows that the effect of input signals 22–24 on solenoids 26–32 is the same as input signals 14–16 on windings 10–12 and 18–20. In this case, however, failure of a winding would make the associated device inoperative.

Figure 3:
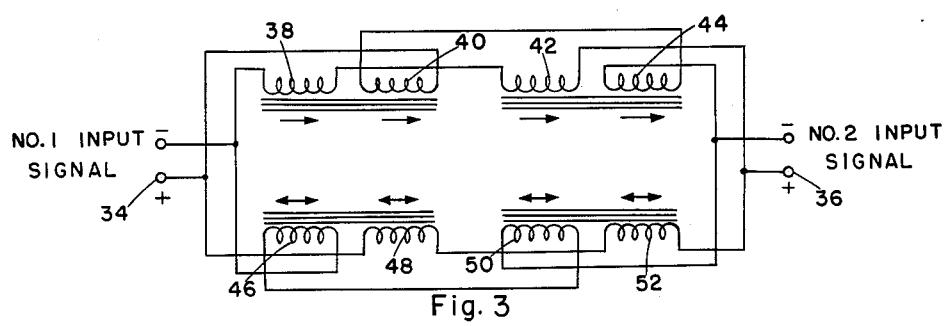
FIGURE 3 is a schematic diagram of four dual-winding solenoids connected in a balanced circuit with two input signals.

FIGURE 3, four dual-winding solenoids are connected with the windings of each solenoid connected in opposite legs of a balanced circuit. Input signals 34–36 polarize windings 38–44 in the same direction and windings 46–52 in opposite directions. This arrangement provides for control of four devices in the same direction when one signal is applied, two being controlled in the same and two in the opposite direction when a second signal is applied. Failure of a single winding will not make the related device inoperative.

Figure 4:
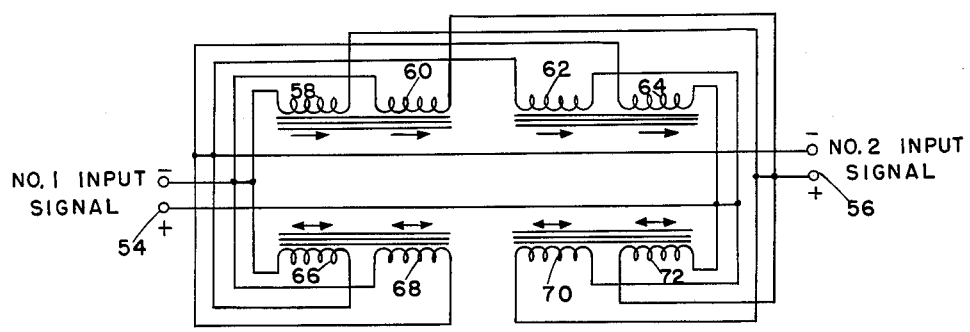
FIGURE 4 shows alternate connections for FIGURE 3.

The circuit of FIGURE 4 is the same in operation as FIGURE 3. The two windings of each solenoid in the figure are connected in the same leg of the balanced circuit. Input signals 54–56 have the same effect as input signals 34–36 and windings 58–64 and 66–72 are polarized the same as windings 38–44 and 46–52.

Figure 5:
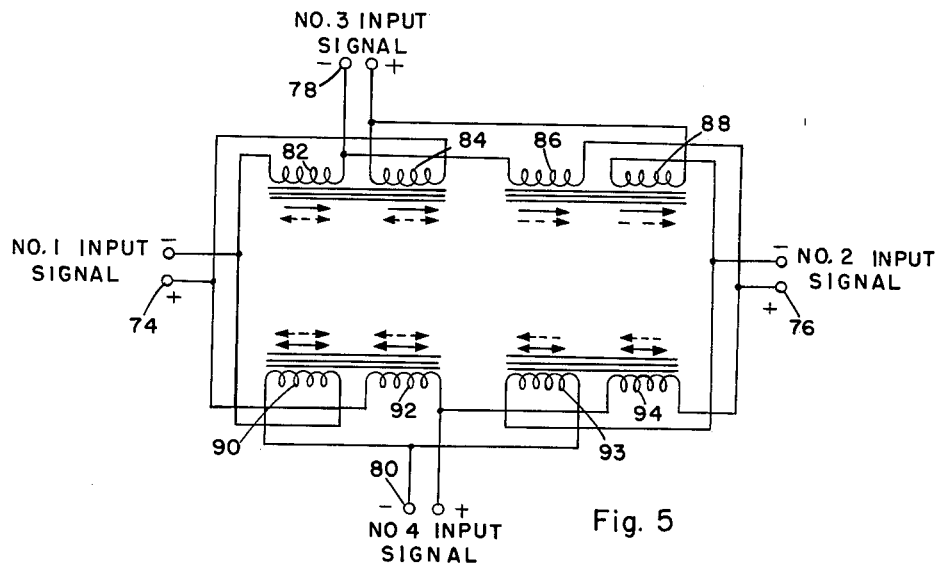
FIGURE 5 is a schematic diagram for four-dual-winding solenoids connected in a balanced circuit with four input signals.

In FIGURE 5, the two separate windings of four solenoids are connected the same as in FIGURE 3. Four input signals instead of two, however, are connected across opposite balance points. The solid arrows show the polarization of windings 82–94 resulting from input signals 74 and 76, and the dashed arrows show the polarization resulting from input signals 78 and 80. In this combination, windings 82–84 are polarized in the same direction by signals 74–76 and in opposite directions by signals 78–80; windings 86–88 are polarized the same by all signals; windings 90–92 are polarized in opposite directions by signals 74–76 and 78–80; and windings 93–94 are polarized in opposite directions by signals 74–76 and in the same directions by signals 78–80. In this circuit, one, two, three, or four input signals may be applied dependent on the kind of control desired.

Figure 6:
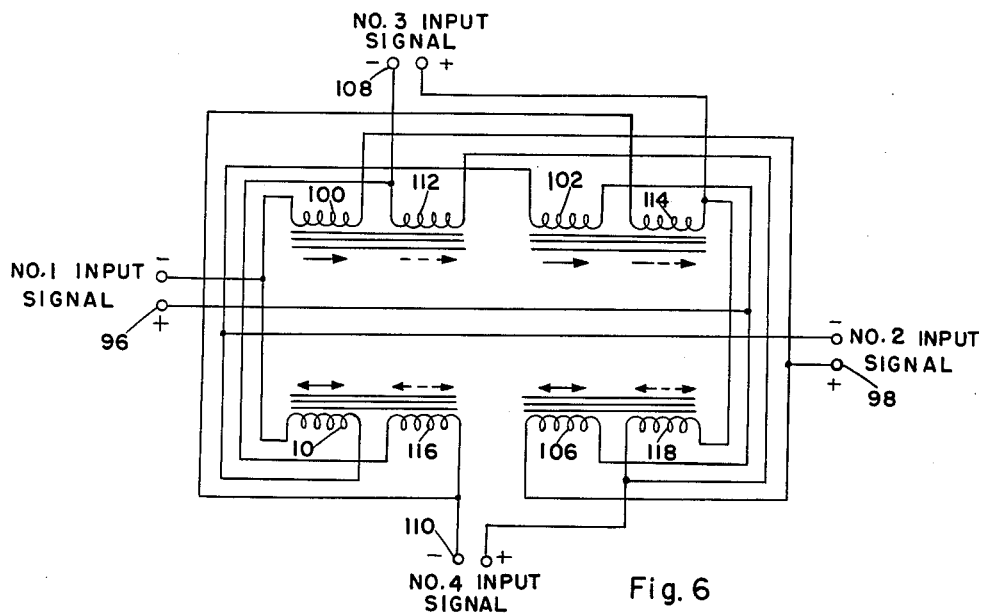
FIGURE 6 shows alternate connections for FIGURE 5.

The circuit of FIGURE 6 is connected as two separate balanced circuits, each containing one of the two windings of the four solenoids shown. Input signals 96–98 are applied to windings 100–106 with polarities as shown by the solid arrows. Input signals 108–110 are applied to windings 112–118 with polarities as shown by the dashed arrows. This arrangement provides polarization of all windings in the same direction by two signals and of half the windings in the opposite direction by two additional signals.

By providing additional windings on solenoids or additional solenoids in multiples of four it is possible to obtain an infinite number of combinations of collective and differential polarization of solenoids in balanced circuits. The peculiar operating characteristics of this type of circuit make it particularly useful for control of devices in the same direction for one type of input signal and in opposite directions for another type of input signal. Use of the method for elevon control as previously described in one practical application. Another is fully disclosed and claimed hereinafter.

Figure 7:
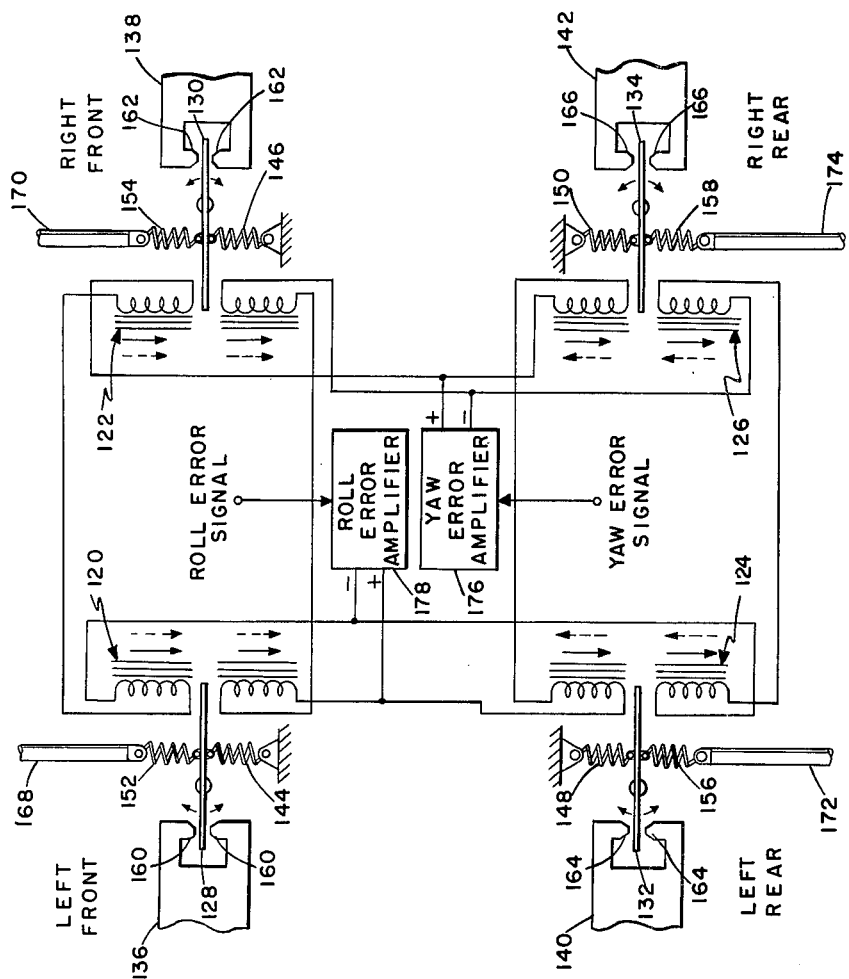
FIGURE 7 is a schematic diagram of an electrohydraulic actuator system suitable for yaw and roll stabilization of an aircraft.
Figure 10:
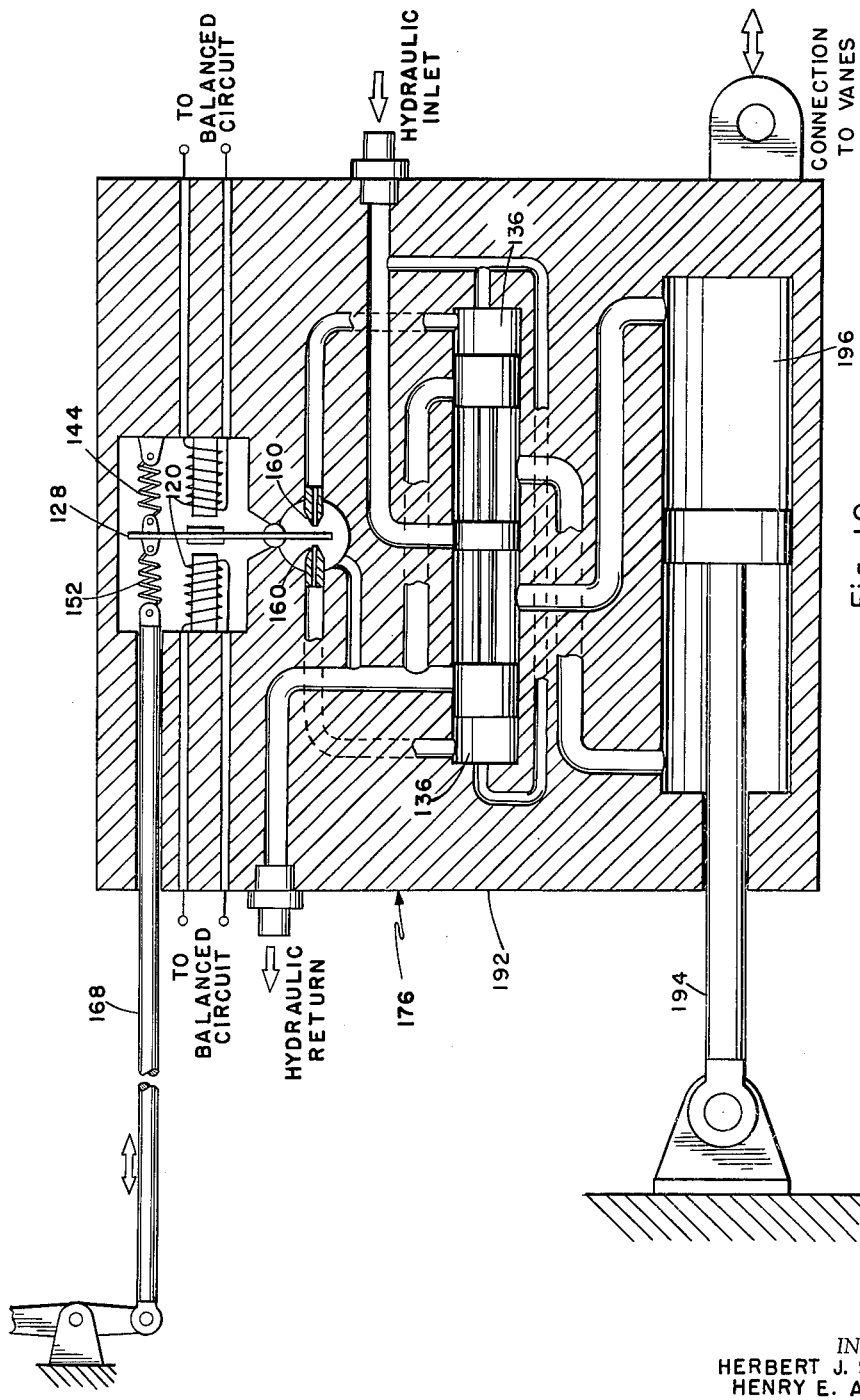
FIGURE 10 shows a suitable electrohydraulic actuator connected for mechanical feedback.

In FIGURE 7, four dual solenoids 120–126 are connected in a balanced circuit for control of four identical electrohydraulic actuators by means of clapper values 128–134. The structure of the actuators is illustrated in FIGURE 10. Clapper valve 128–134 control the pressure in hydraulic preamplifier pressure chambers 136–142. Solenoids 120–126 and tension springs 144–158 vary the position of clapper valves 128–134 with respect to orifices 160–166. The position of the clapper valves determines the magnitude and direction of pressure in the pressure chambers. The four electrohydraulic actuators are connected mechanically to four sets of jet deflection vanes identified as left front, left rear, right front, and right rear. The four sets of vanes are located in the left and right wings of an airplane and control ducted fan thrust for yaw and roll stability during hovering and vertical take-off and landing. Mechanical input rods 168–174 are connected at one end to the normal yaw and roll control devices of the airplane and at the other end to clapper valves 128–134 through tension springs 152–158.

Normal control of yaw and roll is provided by clapper valves 128–134 as displaced by mechanical input rods 168–174 from suitable conventional controls. Stability control of yaw and roll is provided by clapper valves 128–134 as displaced by the magnetic fields of solenoids 120–126. The mechanical and magnetic forces add algebraically. Mechanical input rods 168–174 and tension springs 144–158 also provide the means for applying mechanical feedback in direct proportion to vane rotation as described hereinafter.

Figure 8:
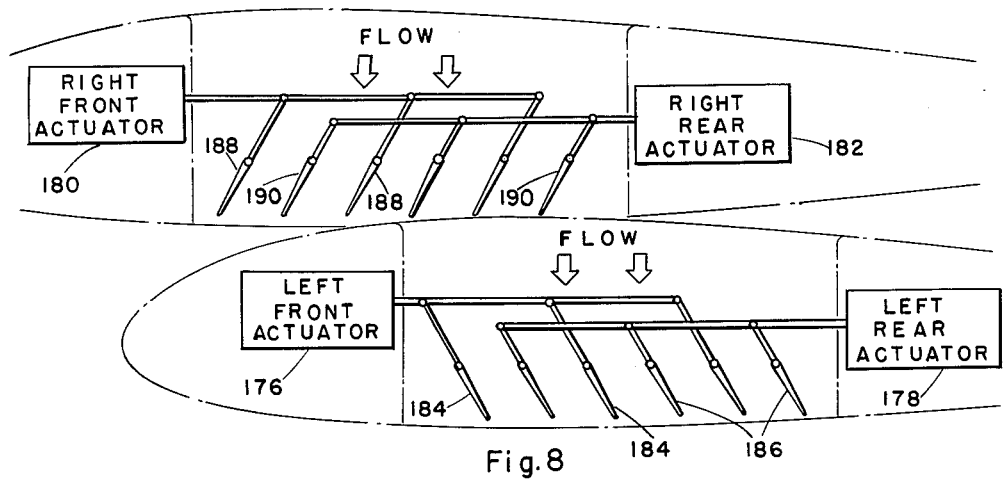
FIGURE 8 shows jet deflecting vanes in an aircraft positioned for control of thrust direction and yaw stability.

When a yaw error signal is applied from a stabilized platform in the vehicle to yaw error amplifier 176 with the polarities shown, solenoids 120–126 are polarized in the same direction as shown by the solid arrows. The magnetic fields of solenoids 120–126 move clapper valves 128–134 in a direction that changes the pressure in hydraulic preamplifier pressure chambers 136–142 and causes hydraulic pressure to be applied to the four actuators. As illustrated in FIGURE 8, vanes 184 and 186 all turn in one direction, while vanes 188 and 190 all turn in the opposite direction, so providing a directional differential of thrust for yaw control.

Figure 9:
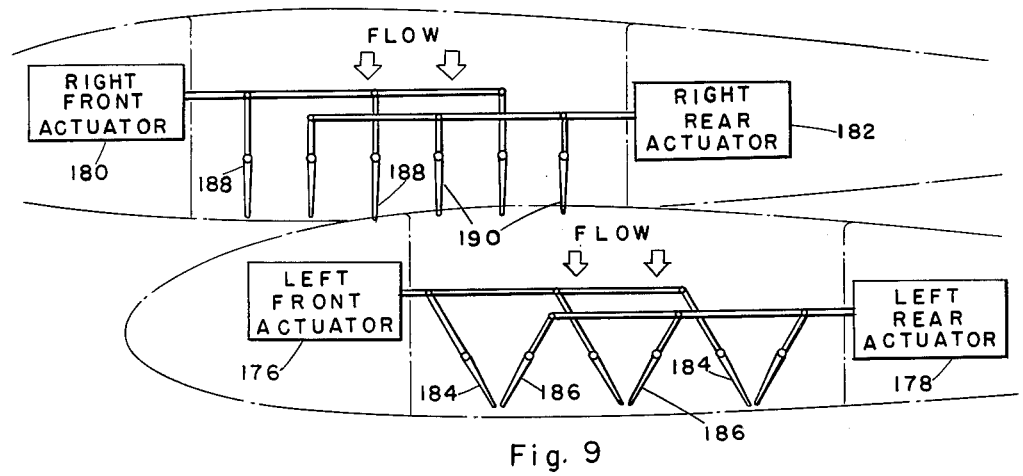
FIGURE 9 shows the jet vanes in position for control of thrust magnitude and roll stability.

When a roll error signal is applied to roll error amplifier 178 with the polarities shown, solenoids 120–122 and 124–126 are polarized in opposite directions as shown by the dashed arrows, clapper valves 128–130 and 132–134 are moved in opposite directions, and the pressure in hydraulic preamplifier pressure chambers 136–138 and 140–142 is changed in opposite directions. As a result, referring to FIGURE 9, vane pairs 184–186 are rotated toward each other, or closed and vane pairs 188–190 are rotated away from each other, or opened, so providing a magnitude differential of thrust for roll control. Vanes 184–186 are shown in fully closed position obstructing about one half of the airflow, while vanes 188–190 are shown fully open or separated, with minimum airflow obstruction. The actual neutral position of the pairs of vanes is substantially midway between the position of vanes 184–186 and that of vanes 188–190 in FIGURE 9. Yaw and roll error signals with polarities opposite to those shown in FIGURE 7 would produce vane rotations opposite to those shown in FIGURES 8 and 9.

Figure 11:
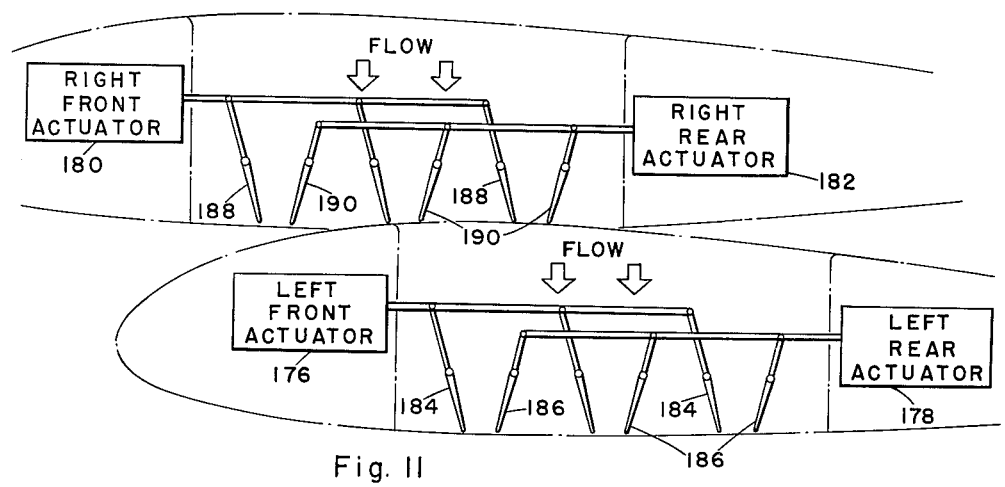
FIGURE 11 shows the jet deflecting vanes in neutral position.
Figure 12:
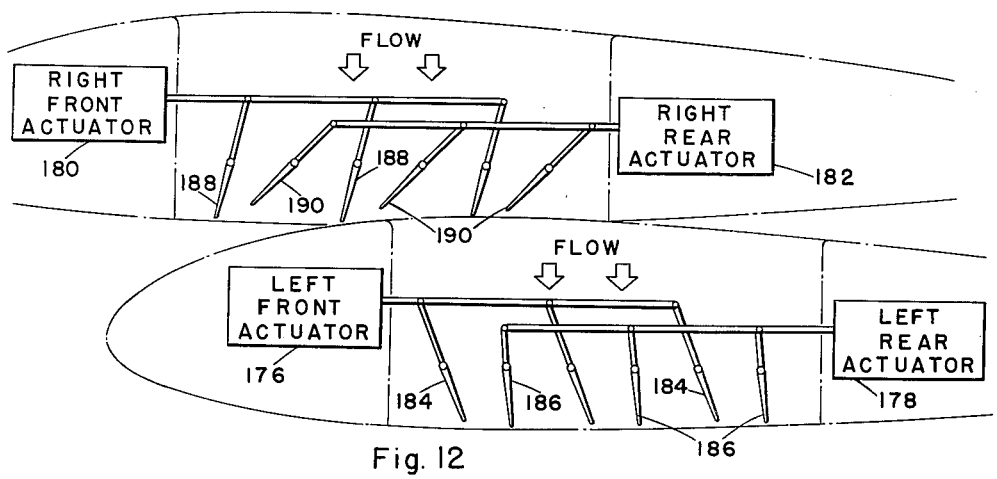
FIGURE 12 shows the vanes in a compound position for roll and yaw action.

For further illustration of the vane action the true neutral position of the vanes is illustrated in FIGURE 11, which can be compared with the position of FIGURE 12 showing compound roll and yaw action. In FIGURE 12 the vanes 188 are deflected slightly forwardly while vane 190 are deflected well forward, the outlet areas between pairs of vanes 188 and 190 being reduced to decrease lift and the flow being exhausted in a generally forward direction. Conversely, vanes 186 are inclined slightly to the rear and vanes 184 are inclined slightly more to the rear, but with less covergence between the vane pairs than with vanes 188 and 190. Thus the thrust is directed forward on one side and to the rear on the other side, giving a yaw reaction, and is greater on one side than on the other, giving a roll reaction. The result in the configuration shown is a turn to the right with the left wing rising.

The method of providing mechanical feedback in a closed servo loop is illustrated for actuator 176 in FIGURE 10. The structure and operation of actuator 178–182 is identical. Actuator body 192, enclosing the electrohydraulic components previously described, is connected mechanically to one set of vanes 184 and is free to move directly with the vanes. Ram piston 194 is attached at one end to the vehicle structure. Consequently, hydraulic pressure applied within ram cylinder 196 moves actuator body 192 and the attached vanes relative to ram piston 194. Flapper valve 128 and attached tension spring 144 move with actuator body 192. Flapper valve 128 and attached tension spring 152 move toward or away from stationary mechanical input rod 168 in a direction opposite to the movement caused by the input error signal applied to solenoids 120. Finally, flapper valve 128 and vanes 184 become centered in the neutral position as the input error signal is reduced to zero.

It is understood that minor variation from the form of the invention disclosed herein may be made without departure from the spirit and scope of the invention, and that the specification and drawings are to be considered as merely illustrative rather than limiting.

We claim:

1. A method of stabilizing a vehicle with control surfaces common to two axes comprising the steps of:

applying a first electromotive force indicating one error to a plurality of actuators for control surfaces so that all control surfaces are urged in a common direction;
simultaneously applying a second electromotive force indicating another error to said actuators so that an equal plural number of said same control surfaces are urged in opposite directions, whereby the combined actions of said actuators cause certain of said control surfaces to move more than others in said common direction; and
applying an opposing force, created by rotation of said control surfaces, to said actuators so that the effect of said electromotive forces is reduced to zero.

2. A method of stabilizing a vehicle relative to the yaw and roll axes with control surfaces common to both axes comprising the steps of:
applying an electromotive force indicating yaw error to a plurality of actuators for control surfaces so that all control surfaces are urged in a common direction;
applying an electromotive force indicating roll error to said actuators so that an equal plural number of said same control surfaces are urged in opposite directions, whereby the combined actions of said actuators cause certain of said control surfaces to move more than others in said common direction; and
applying an opposing force, created by rotation of said control surfaces, to said actuators so that the effect of said electromotive forces is reduced to zero.

3. A method of stabilizing a vehicle relative to the yaw and roll axes with control surfaces common to both axes comprising the steps of:
applying an electromotive force indicating yaw error to a plurality of actuators for jet deflection vanes so that all vanes are urged in a common direction, to change the direction of thrust;
applying an electromotive force indicating roll error to said actuators so that an equal plural number of said same vanes are urged in opposite directions, to change the magnitude of thrust, whereby the combined actions of said actuators cause certain of said vanes to move more than others in said common direction; and
applying an opposing force, created by rotation of said vanes, to said actuators so that the effect of said electromotive forces is reduced to zero.

4. A method of stabilizing a vehicle relative to the yaw and roll axes with control surfaces common to both axes comprising the steps of:
applying an electromotive force indicating yaw error to actuators for a plurality of sets of jet deflection vanes so that all vanes are urged in a common direction, to change the direction of thrust;
applying an electromotive force indicating roll error to said actuators so that an equal number of related sets of the same vanes are urged toward and an equal number of related sets are rotated away from each other, to change the magnitude of thrust, whereby the combined actions of said actuators cause certain of said vanes to move more than others in said common direction; and
applying an opposing force, created by rotation of said vanes, to said actuators so that the effect of said electromotive forces is reduced to zero.

5. The method of claim 4 in which said opposing force is a mechanical force.

6. In a system for stabilizing a vehicle relative to two axes with control surfaces common to both axes, the combination comprising:
a plurality of actuators for said control surfaces;
means for applying a first electromotive force indicating one error to said actuators so that all said control surfaces are urged in a common direction;
means for simultaneously applying a second electromotive force indicating another error to said actuators so that an equal plural number of said same control surfaces are urged in opposite directions, whereby the combined actions of said actuators cause certain of said control surfaces to move more than others in said common direction;
means for creating an opposing force caused by rotation of said control surfaces; and
means for applying said opposing force to said actuators so that the effect of said electromotive forces is reduced to zero.

7. In a system for stabilizing a vehicle relative to the yaw and roll axes with control surfaces common to both axes, the combination comprising:
a plurality of actuators for said control surfaces;
means for applying a first electromotive force indicating yaw error to said actuators so that all said control surfaces are urged in a common direction;
means for applying a second electromotive force indicating roll error to said actuators so that an equal plural number of said same control surfaces are urged in opposite directions, whereby the combined actions of said actuators cause certain of said control surfaces to move more than others in said common direction;
means for creating an opposing force caused by rotation of said control surfaces; and
means for applying said opposing force to said actuators so that the effect of said electromotive forces is reduced to zero.

8. In a system for stabilizing a vehicle relative to the yaw and roll axes with control surfaces common to both axes, the combination comprising:
a plurality of actuators for jet deflection vanes;
means for aplying a first electromotive force indicating yaw error to said actuators so that all said vanes are urged in a common direction to change the direction of thrust;
means for applying a second electromotive force indicating roll error to said actuators so that an equal plural number of said same vanes are urged in opposite directions, to change the magnitude of the thrust, whereby the combined actions of said actuators cause certain of said control surfaces to move more than others in said common direction;
means for creating an opposing force caused by rotation of said vanes; and
means for applying said opposing force to said actuators so that the effect of said electromotive forces is reduced to zero.

9. In a system for stabilizing a vehicle relative to the yaw and roll axes with control surfaces common to both axes, the combination comprising:
an actuator for each of a plurality of sets of jet deflection vanes;
means for applying a first electromotive force indicating yaw error to said actuators so that all said vanes are urged in a common direction, to change the direction of thrust;
means for applying a second electromotive force indicating roll error to said actuators so that an equal number of related sets of said same vanes are urged toward each other and an equal number of related sets are urged away from each other, to change the magnitude of thrust, whereby the combined actions of said actuators cause certain of said control surfaces to move more than others in said common direction;
means for creating an opposing force caused by rotation of said vanes; and
means for applying said opposing force to said actuators so that the effect of said electromotive forces is reduced to zero.

10. Apparatus according to claim 9 comprising:
an actuator for each of a plurality of sets of jet deflection vanes, said sets being arranged as left front and left rear vanes and right front and right rear vanes, each actuator having at least an armature and first and second solenoid windings, all first windings being connected in series, all second windings being connected in series, the two series combinations being connected in a parallel combination;

a yaw error signal amplifier with input connected to a yaw error signal source and output connected across said parallel combination so that a polarized yaw error signal causes said actuators to urge certain of said vanes in the same direction;

a roll error signal amplifier with input connected to a roll error signal source and output connected across the electrical center of each said series combination so that a polarized roll error signal causes said actuators to urge related sets of said vanes in opposite directions;

a first mechanical linkage connected between the body of each said actuator and a related set of vanes so that said body moves simultaneously in direct proportion with vane rotation; and a second mechanical linkage and first and second tension springs for each actuator, one end of said springs being connected to opposite sides of said armature, the other end of said first tension spring being connected to said body, the other end of said second tension spring being connected to said second mechanical linkage, said second mechanical linkage remaining stationary when said body moves whereby said armature is displaced by said error signal and in an opposite direction by said vane rotation.

11. Apparatus according to claim 10 in which said actuators are electrohydraulic.

References Cited by the Examiner

UNITED STATES PATENTS

| | | | |
|---|---|---|---|
| 2,605,325 | 7/52 | Glassburn | 317—153 X |
| 2,826,896 | 3/58 | Glaze et al. | 244—83 |
| 2,944,524 | 7/60 | Brandstadter et al. | 244—78 |
| 2,964,905 | 12/60 | Hewson et al. | 244—52 X |
| 2,968,453 | 1/61 | Bright | 244—52 X |
| 2,979,290 | 4/61 | Baliguet et al. | 244—77 |
| 3,018,988 | 1/62 | Ernst et al. | 244—78 X |
| 3,066,635 | 12/62 | Augustin | 244—77 |
| 3,123,320 | 3/64 | Slaughter | 244—52 X |

MILTON BUCHLER, *Primary Examiner.*

ANDREW H. FARRELL, *Examiner.*